Figure 1:
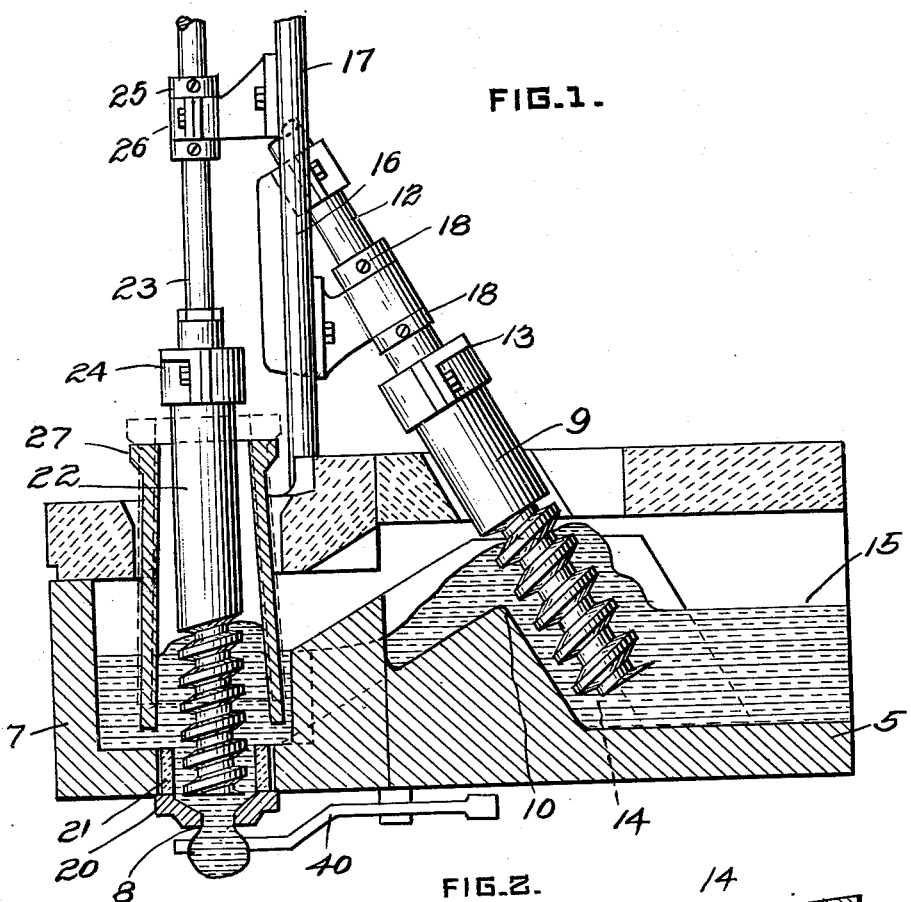

Oct. 20, 1931.  C. H. RANKIN  1,828,442
GLASS FEEDER
Filed Jan. 20, 1923  2 Sheets-Sheet 1

WITNESS
J. Herbert Bradley.

INVENTOR
Carl H Rankin
by Green & McCallister
his attorneys

Oct. 20, 1931.  C. H. RANKIN  1,828,442
GLASS FEEDER
Filed Jan. 20, 1923   2 Sheets-Sheet 2
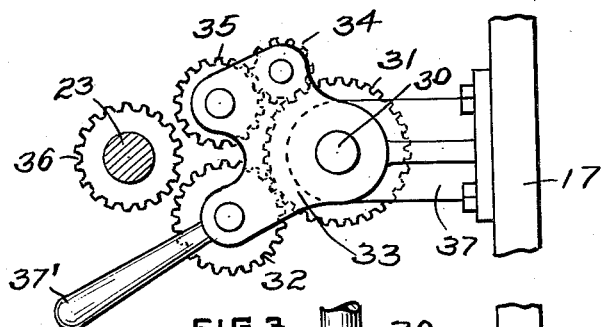
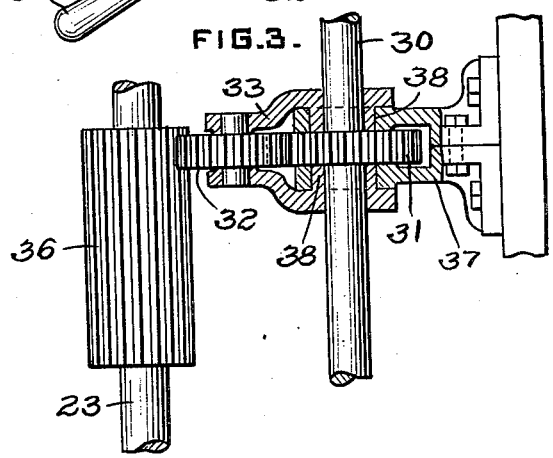
WITNESS
J. Herbert Bradley.
INVENTOR
Carl H. Rankin Patented Oct. 20, 1931

1,828,442

UNITED STATES PATENT OFFICE

CARL H. RANKIN, OF WELLSBURG, WEST VIRGINIA, ASSIGNOR, BY MESNE ASSIGNMENTS, TO HARTFORD-EMPIRE COMPANY, OF HARTFORD, CONNECTICUT, A CORPORATION OF DELAWARE

GLASS FEEDER

Application filed January 20, 1923. Serial No. 613,877.

This invention relates to apparatus for feeding molten glass in the form of globular gathers which may be delivered to a glass blowing or pressing machine.

An object of this invention is to produce a new and improved feeder in which the delivery of molten glass through an orifice is mechanically and positively controlled for the purpose of controlling both the size and shape of the gob or gather so delivered.

A further object is to produce a feeder in which improved means are employed for controlling the delivery of gobs or gathers whereby the size and shape of the gob may be more effectively controlled throughout a wider range of sizes and shapes than is possible with feeders now in use and known to me.

A further object is to produce a feeder which is of simple construction, is simple to operate both for the purpose of delivering gobs or gathers and of controlling the size and shape of the gob or gather so delivered.

These and other objects which will be made more apparent through the further description of my invention are attained by means of apparatus herein described and illustrated in the drawings forming a part hereof.

Figure 2:
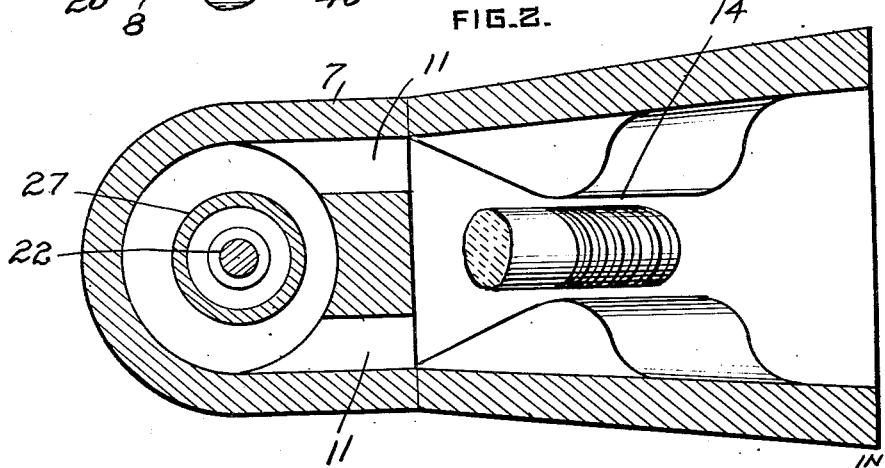

In the drawings, Figure 1 is a somewhat diagrammatic sectional view of a glass feeder embodying my invention. Fig. 2 is a sectional plan view of the apparatus shown in Fig. 1, and Fig. 3 is a somewhat diagrammatic view, shown partially in section, of apparatus forming a detail of my invention. Fig. 4 is a plan view of the apparatus shown in Fig. 3.

Glass feeders are ordinarily employed in connection with automatic blowing or pressing machines. The feeder forms the gob or gather which is delivered to the machine and is subsequently blown or pressed, or blown and pressed into the finished article. It is essential in such apparatus not only to deliver gobs of uniform size, but also to deliver gobs of predetermined and uniform shape. In addition, it is also necessary to provide a feeder in which both the shape and size of the gob may be readily and easily varied and maintained substantially constant for long periods of operation. This has been accomplished in a fairly satisfactory manner by means of glass feeders employing a reciprocating plunger which operates above a flow orifice for the purpose of influencing and to some extent controlling the rate of gravity flow through the orifice. In such apparatus, the adhesive quality of the molten glass plays an important part in determining both the size and the shape of the gob. This quality of molten glass, however, varies with the temperature; consequently the degree of control is extremely limited and in addition a change in the temperature of the glass may occasion a material change in both the size and the shape of the gob, even though the feeder is functioning properly.

One of the objects of my invention is to avoid this difficulty and to provide means for positively controlling both the size and shape of the gob which is in effect independent of the adhesive quality of the glass.

In carrying out my invention, I prefer to employ a container 5 which receives molten glass from a glass furnace. I also employ a forehearth or receptacle 7 which receives regulable amounts of molten glass from the furnace or container 5, and from which the glass is delivered in the form of gobs or gathers. The receptacle 7 is provided with a delivery orifice 8 which, as shown, is located in the floor of the receptacle, but the receptacle is provided with mechanical means for positively controlling both the rate and direction of glass flow through the orifice, and consequently I am not limited to an orifice located in the position shown, since the flow of glass through the orifice is independent of the head of glass above it.

As illustrated, glass is delivered from the container 5 to the receptacle 7 by means of a pump element 9 which is capable of lifting the glass over a dam or obstruction 10 and thereby causing it to flow in regulable amounts or in a regulable stream into the receptacle 7 through two downwardly inclined passages 11. As shown, the pump element 9 is similar to an Archimedes' screw and operates on the principle of such a screw. It consists of a refractory shell mounted on a reinforcing rod or structure formed of heat resisting steel. The refractory shell is provided at its lower end with screw threads of the desired size and pitch. This element is mounted on a rotatable shaft 12 by means of a clamp 13 and is so located and arranged within the container that it co-operates with the face of a semi-cylindrical recess 14 formed in the dam 10. The recess 14 partially surrounds the screw threaded portion of the element, which, as illustrated, normally projects below the surface of the glass 15 within the container. Under such conditions, the rotation of the element 9 in one direction causes the glass to be positively raised from the container over the dam 10 and the rate of delivery of such glass is directly proportional to the rate of rotation of the element. The co-operation between the screw threaded portion of the element 9 and the semi-cylindrical face of the recess 14 is substantially similar to the co-operation between the rotating element or propeller of an Archimedes' screw, and the casing enclosing the propeller. The wall of the recess 14 prevents lateral displacement of the glass and therefore the rotation of the screw occasions a positive lift which is independent of the degree of adhesiveness of the glass. The rate of flow from the container 5 to the receptacle 7 and the amount of glass delivered, can, therefore, be definitely controlled by varying the rate of rotation of the element 9, or the duration of its period of rotation.

Where it is desirable to rotate the element 9 at a constant speed, the delivery of glass from the container to the receptacle 7 may be controlled by varying the effectiveness of the element as a pumping agent. This may be accomplished by varying the amount of submergence of the element 9 or by varying the lateral position of that element with relation to the wall of the recess 14.

In the drawings, the shaft 12 is mounted on a bracket 16 which is in turn mounted on stationary supports 17. The bracket 16 is preferably so mounted on the supports that it is capable of being adjusted longitudinally thereof for the purpose of varying the position of the screw threaded element 9, both with relation to the wall of the recess 14 and the level of the glass within the container. The shaft 12 is shown provided with thrust collars 18 which are adapted to bear against opposite ends of an arm of the bracket 16 in which the shaft is journaled for the purpose of supporting the shaft in a definite position with relation to the bracket. These collars are preferably adjustable and are secured to the shaft by any suitable means such for example as set screws so that they may be adjusted longitudinally for the purpose of varying the depth to which the screw threaded element 9 projects into the glass within the container 5. With this adjustment and the adjustment of the bracket 16, the rate of glass feed from the container may be materially varied without varying the speed of rotation of the shaft.

The shaft 12 may be driven by any suitable mechanism, but is preferably driven by a constantly rotating shaft or motor, not shown.

The receptacle 7 is preferably substantially cylindrical and the orifice 8 is preferably located substantially concentric with the cylindrical side walls thereof. As shown, the passages 11 are so located that they deliver glass to the receptacle on opposite sides of the orifice and substantially tangentially with relation to the edge of the orifice. This occasions a more uniform distribution of the glass within the receptacle, and consequently a more uniform distribution to the orifice 8.

In the drawings, the orifice 8 is shown formed in an orifice block 20 which is secured to the bottom face of the receptacle floor. The orifice is aligned with a cylindrical pocket or recess 21 formed in the floor of the receptacle and into which a pump element 22 normally projects. As shown, the pump element consists of a refractory shell which is provided at its lower end with screw threads and is preferably reinforced by a heat resisting metal rod or structure. With the arrangement of apparatus shown, the element 22 preferably extends vertically since it is desirable to mount it in axial alignment with the recess 21 and the orifice 8. The element 22 also projects downwardly through an opening provided in the top of the receptacle 7, and is secured to a rotatable shaft 23 by means of a clamp 24. The shaft 23 carries thrust collars 25 which engage a support bracket 26 mounted on the supports 17. These collars are preferably adjustable longitudinally of the shaft for the purpose of varying the position of the member 22 relatively to the recess 21, although this adjustment may be obtained by moving the bracket 26 along the supports 17.

A sleeve valve 27 formed of refractory material surrounds the element 22, and normally projects downwardly through the opening in the top of the receptacle and below the surface of the glass contained within the receptacle, so that it in effect forms a continuation of the recess 21. This valve is movable longitudinally of the element 22 towards and away from the floor of the receptacle.

Any suitable means may be employed for mounting the sleeve valve 27, but I preferably employ mounting and operating elements similar to those disclosed in connection with the sleeve valve 7 of my application No. 342,887, filed December 6, 1919, Patent No. 1,600,361, granted September 21, 1926. With such an arrangement, the position of the sleeve valve may be varied at will, or the sleeve valve may be reciprocated automatically and under the control of a timing mechanism such as is usually employed in connection with glass feeders.

The element 22 performs the function of a pump and controls the direction and extent of glass flow through the orifice 8. It operates on the principle of an Archimedes' screw and in so doing, co-operates with the cylindrical wall of the recess 21, and with the sleeve valve 27.

Any suitable means may be employed for rotating the element 22, but in Figs. 3 and 4, I have illustrated a gearing which may be employed in rotating the member, first in one direction and then the other.

As illustrated, the shaft 30 is preferably a constantly rotating shaft forming a part of the feeder mechanism. A gear 31 is rigidly mounted on this shaft and meshes with a gear 32 journaled on a pivotally mounted housing 33. The housing 33 also carries a gear 34 which meshes with the gear 31, and with a gear 35, also journaled in the housing.

The housing 33 is so located and arranged that it may be turned about the shaft 30 to move either the gear 32 or the gear 35 into mesh with a gear 36 rigidly mounted on the shaft 23. As illustrated, this is accomplished by pivotally mounting the housing 33 on a bracket 37 with the pivoted point concentric with the axis of the shaft 30. The housing 33 may be formed in four sections, to facilitate assembling, and it may be provided with bearing bushings 38 which engage the shaft 30 and which also project into cylindrical apertures formed in the bracket 37. The gear 36 is preferably elongated axially of the shaft 23, so that it may be engaged by either of the gears 32 and 35 for all vertical positions of the element 22.

It will be apparent that the shaft 23, and consequently the element 22 will be rotated in one direction when the pivotal housing 33 is turned so as to move the gear 32 into mesh with the gear 36 and will be rotated in the opposite direction when the housing is turned to shift the gear 32 out of mesh and the gear 35 into mesh with the gear 36. It will also be apparent that the element 22 will remain stationary when the housing 33 occupies an intermediate position in which neither of the gears 32 and 35 mesh with the gear 36. Any suitable means may be employed for shifting the position of the housing 33 as, for example, an arm 37', but the housing will preferably be actuated by cams or other mechanisms operated by the timing mechanism of the feeder.

Shears 40 such as are illustrated in my co-pending application No. 547,907, renewed March 29, 1922, are located in the usual position below the orifice 8 and are actuated by suitable gear actuating mechanism so as to co-operate with the feeder element 22 in severing suspended gobs formed below the orifice 8.

The operation of the apparatus is as follows:—After the container 5 has been filled with molten glass to the desired level, element 9 is adjusted to the desired position with relation to the recess 14 and the level of the glass within the container. It is then rotated so as to feed the requisite quantities of glass into the receptacle 7. It will of course be understood that the container, the receptacle and all associated parts have been raised to a working temperature. When the desired quantity of glass is in the receptacle 7, the orifice 8 is unplugged in the usual manner and the element 22 set in operation. Rotation of this element in one direction occasions a positive feed of glass downwardly through the orifice. After the requisite amount of glass has been delivered through the orifice to form a gob of the desired size, the gob is shaped, while it is still suspended from the orifice by either stopping the rotary movement of the element 22 for an instant, or by reversing the rotation of the element 22, and manipulating the sleeve valve 27 or by retracting the element 22. The gob is preferably shaped by reversing the direction of rotation of the element 22 and by lifting the sleeve 27 an appreciable distance from the floor of the receptacle so that the effective pumping action is materially diminished. During this operation, the weight of the gob below the orifice occasions an attenuation of the portion of the gob immediately adjacent to the orifice, thereby forming a neck of reduced cross section through which the gob is severed by the action of shears 40. The extent of attenuation depends upon the backward pull of the glass occasioned by the reverse rotation of the element and also depends upon the period of time during which the gob is suspended after the delivery of glass from the receptacle to it has ceased.

As soon as the shears 40 have operated, the element 22 is rendered effective for the purpose of retracting the severed stub into the heated zone of the receptacle 7. This may be accomplished by momentarily increasing the speed of rotation of the member 22 or it may be accomplished by moving the sleeve valve 27 into close proximity with the floor of the receptacle so that it forms in effect, an uninterrupted continuation of the recess 21.

After the severed stub is retracted, the sleeve valve is preferably raised momentarily for the purpose of replenishing the supply of glass around the element 22. It is then moved downwardly toward the floor of the receptacle to a predetermined position and the direction of rotation of the element 22 is reversed for the purpose of again pumping molten glass through the orifice 8 to form a gob or gather. During this operation, the various moving elements may be controlled automatically by a timing mechanism, such as is usual in feeders, and the glass delivery element 9 may, if desired, be actuated so as to deliver an intermittent or pulsating flow of glass to the receptacle in synchronism with the cycle of operation of the element 22.

The operation of forming gobs or separate gathers consists in feeding regulable amounts of molten glass from the container 5 to the receptacle 7 and simultaneously controlling the effective operation of element 22 so that it operates to positively feed molten glass through the orifice, to check the flow through the orifice, and to reverse the flow through the orifice; the shears operating at the point in the cycle between the time that the flow through the orifice is checked and reversed.

It will be apparent that the apparatus disclosed is not only effective as a glass feeding apparatus, but it is also effective in that it tends to maintain the glass at the orifice at a uniform temperature and homogeneous with relation to temperature. The rotation of the element 22 and its pumping actions contribute to this effect, since it occasions a positive feed in all directions toward the orifice. It will also be apparent that the size and shape of the gob delivered may be controlled through a wide range with a maximum degree of accuracy. The amount of glass available within the receptacle 7 will, to some extent, influence the pumping operation of the element 22 and this can be positively controlled by a proper manipulation of the element 9. In addition to this, the effectiveness of the pumping operation of the element 22 may be materially varied by shifting the position of the sleeve valve 27. If this sleeve valve is raised a substantial distance from the floor of the receptacle, so that it does not co-operate with the upper threads of the element 22, the pumping effect of these threads is nullified and consequently the effectiveness of the element 22 is reduced. From this it will be apparent that the effective operation of the element 22 may be varied through a wide range and that consequently the size and shape of the gob may be accordingly controlled.

In addition, the continuous kneading of the glass immediately above the orifice is beneficial, since it insures uniformity. At the same time, this kneading, accomplished as it is by the rotation of a screw, is moderate, and does not tend to introduce air bubbles or blubs into the glass.

In accordance with the patent statutes, I have described what I now consider to be a preferred embodiment of my invention, but it will be understood by those skilled in the art that various changes, modifications, additions and omissions may be made in the apparatus illustrated without departing from the spirit and scope of the invention as set forth by the appended claims.

I claim as my invention:

1. In combination in a feeder for molten glass, a receptacle for molten glass, an orifice through which glass from said receptacle is delivered, and a reversible rotatable pump mechanism rendered effective by its rotation to control positively the flow of glass through said orifice.

2. In combination in a feeder for molten glass, a receptacle for molten glass, having an orifice through which glass from the receptacle is delivered, a pump mechanism located immediately adjacent said orifice and rotatable in one direction to force molten glass therethrough to form a suspended gob, and rotatable in the opposite direction to retract the stub, after the gob is severed therefrom.

3. In combination in a feeder for molten glass, a receptacle for molten glass having an orifice through which glass from the receptacle is fed, a rotatable pump element located immediately adjacent said orifice for forcing glass therethrough to form a gob, means for controlling the effective operation of said element to vary the size of the gob, means for severing the gob so formed and means for reversing the direction of rotation of the element to retract the severed stub into the receptacle.

4. In combination in a feeder for molten glass, a receptacle for molten glass having an orifice through which glass from the receptacle is fed, a rotatable pump element located within said receptacle for positively forcing molten glass through the orifice and for positively retracting the severed stub into the orifice, and means movable with relation to the pump element for varying the effective operation of the pump element independently of the speed thereof.

5. In combination in a glass feeder, a receptacle for molten glass having an orifice through which glass from the receptacle is fed, a rotatable element located within the receptacle for controlling the direction and rate of flow through the orifice, means for adjusting the position of said element toward and away from said orifice, a member located within the receptacle and movable longitudinally of said element for controlling the effective operation of said element.

6. In combination in an apparatus for feeding molten glass, a receptacle for molten glass having a glass delivery orifice formed therein, a rotatable pump element located within the receptacle adjacent to said orifice and movable toward and away from the orifice, said element having a glass engaging projection thereon for impelling glass in the general direction of length of the element as said element rotates about its axis.

7. In combination in an apparatus for feeding molten glass, a receptacle for molten glass having a flow orifice formed therein, a rotatable pump element extending through the glass within the receptacle and into proximity with the orifice and movable toward and away from said orifice, means for rotating said element, and a sleeve valve surrounding said element and movable toward and away from said orifice.

8. In combination in an apparatus for feeding molten glass, a receptacle for molten glass having an orifice through which glass is fed, and a rotatable element extending through glass in the receptacle and into proximity with the orifice and movable toward and away from the orifice, and a sleeve valve surrounding said element and movable toward and away from said orifice.

9. In combination in an apparatus for feeding molten glass, a receptacle for molten glass having an orifice through which glass is fed, and a rotatable element extending through glass in the receptacle and into proximity with the orifice and movable toward and away from the orifice, said element having a spiral glass-engaging projection thereon, and means for rotating said element first in one and then in the other direction for intermittently feeding mold charges of molten glass through said orifice.

10. In combination in apparatus for feeding molten glass, a receptacle for molten glass having a recess formed in a wall thereof below the level of glass contained within the receptacle, and an orifice formed in a wall of the recess, a rotatable pump element associated with the recess for controlling the flow of glass through the orifice, and a cylindrical valve movable toward and away from said recess to vary the effective operation of the pump element.

11. In combination in an apparatus for feeding molten glass, a receptacle for molten glass having a recess formed in a wall thereof and a feed orifice formed in a wall of the recess, a rotatable element movable toward and away from said orifice and associated with said recess to control the delivery of glass from the receptacle through the orifice and a hollow cylindrical valve located within the receptacle.

12. In an apparatus for feeding molten glass, a receptacle having a feed orifice and means for controlling the delivery of glass through the orifice, in combination with a container for molten glass, a dam located between said container and said receptacle and provided with a substantially cylindrical recess in the container side thereof, a rotatable screw threaded element projecting into the glass of said container and associated with said recess, and means for rotating said element.

13. In an apparatus for feeding mold charges of molten glass, a receptacle provided with a delivery orifice submerged by a body of molten glass contained within said receptacle, an element extending into said body and having a helical surface formed thereon and means for moving said element to render said surface effective in propelling glass through said orifice.

14. In an apparatus for feeding mold charges of molten glass, a receptacle provided with a delivery orifice submerged by a body of molten glass contained within said receptacle, a threaded element associated with said orifice and adapted to be operated so as to control the feed of glass therethrough and a sleeve surrounding said element and movable to vary the effective operation of said element.

15. In an apparatus for feeding mold charges of molten glass, a receptacle provided with a delivery orifice submerged by a body of molten glass contained within said receptacle, a threaded element associated with said orifice and adapted to be rotated so as to control the feed of glass therethrough and a sleeve surrounding said element and movable with relation to said orifice so as to vary the effective operation of said element.

16. In an apparatus for feeding mold charges of molten glass, a receptacle provided with a delivery orifice submerged by a body of molten glass contained within said receptacle, a threaded element associated with said orifice, movable toward and away from said orifice and adapted to be rotated to effect the feed of glass therethrough and a sleeve surrounding said element above said orifice and movable axially of said element to vary the effective operation thereof.

17. In an apparatus for feeding mold charges of molten glass, a receptacle provided with a delivery orifice submerged by a body of molten glass contained within said receptacle, a threaded element associated with said orifice, movable toward and away from said orifice and adapted to be rotated to effect the feed of glass therethrough, a sleeve surrounding said element above said orifice and movable axially of said element to vary the effective operation thereof and means for directing molten glass to said orifice from different sides thereof.

18. In an apparatus for feeding molten glass, a receptacle provided with a delivery orifice submerged by a body of molten glass contained within said receptacle, a threaded element associated with said orifice and adapted to be rotated so as to control the feed of glass therethrough, a sleeve surrounding said element and movable to vary the effective operation thereof, a container for molten glass associated with said receptacle, a dam between said container and said receptacle, a threaded element extending into a body of molten glass within said container and rotatable so as to lift glass from said body over said dam and means for directing glass flowing over said dam to different sides of said orifice.

19. In combination in a glass feeder, a receptacle for molten glass having an orifice through which glass from the receptacle is fed, a rotatable element located within the receptacle for controlling the direction and rate of flow through the orifice, means for adjusting the position of said element toward and away from said orifice and means for rotating said element for feeding molten glass through said orifice.

20. The combination of a container for molten glass having an outlet opening in the bottom thereof, means for supplying glass to the container, a regulating plug projecting into the glass over the outlet, said plug formed with a spiral thread, and means for continuously rotating the plug.

21. The combination of a container for molten glass having an outlet opening in the bottom thereof, means for supplying glass to the container, a regulating plug projecting into the glass over the outlet, said plug formed with a spiral thread, and automatic means for continuously rotating the plug in either direction.

22. The combination of a container for molten glass having an outlet opening in the bottom thereof, means for supplying glass to the container, a regulating plug projecting into the glass over the outlet, said plug formed with a spiral thread, and means for causing a relative rotation of the plug and container.

23. A machine for handling molten or plastic material comprising a chamber for containing molten or plastic material, an agitator member mounted for rotation within said chamber, means for imparting rotation to said agitator member in alternate directions and in regular sequence, means carried by the agitator member adapted to raise and lower material within the chamber in accordance with the direction of rotation imparted to the agitator member separate controllable means for imparting rotation to said agitator member in one direction only and applicable thereto at will.

In testimony whereof, I have hereunto subscribed my name this 2nd day of January, 1923.

CARL H. RANKIN.